Oct. 16, 1951 — N. S. REYNOLDS — 2,571,486
PISTON ASSEMBLY
Filed May 11, 1948
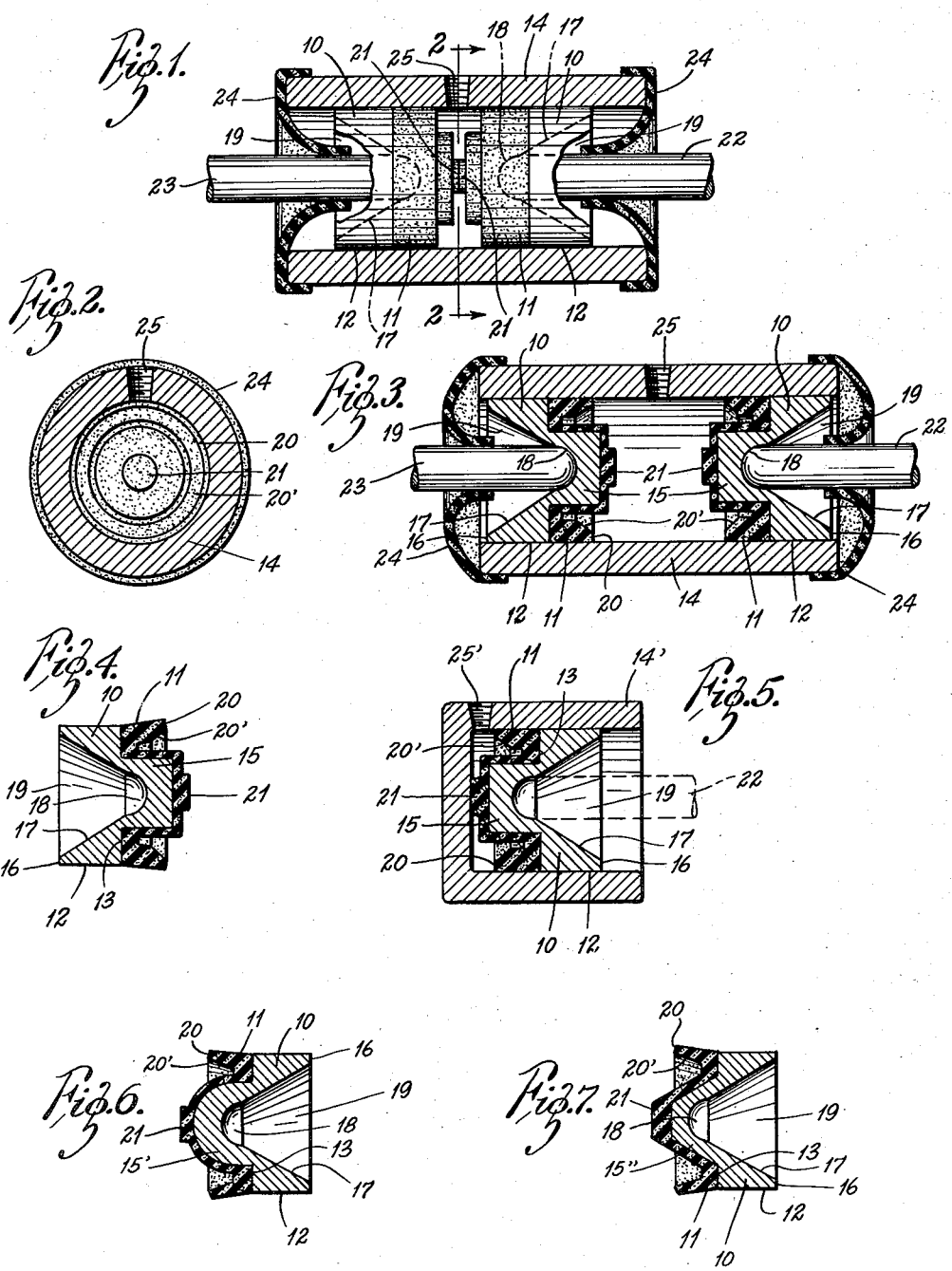
INVENTOR:
NOEL S. REYNOLDS,
BY Rogers & Ezell
ATTORNEYS.

Patented Oct. 16, 1951

2,571,486

UNITED STATES PATENT OFFICE 2,571,486

PISTON ASSEMBLY

Noel S. Reynolds, St. Louis, Mo.

Application May 11, 1948, Serial No. 26,409

1 Claim. (Cl. 309—33)

The present invention relates generally to a piston assembly, and more particularly to pistons used in the hydraulic brake systems of automotive equipment.

It is an object of the present invention to provide a piston in which the brake pin within the bore of the piston extends beyond the plane of the forward edge of that part of the piston body which is in sliding contact with the cylinder wall, so as to bring the end of the pin close to the central pressure plane of the irregular shaped surface which is acted upon by the fluid.

Another object is to provide a piston in which the end receiving the brake pin has a narrow edge so that the center portion of the protective boot on the end of the cylinder can be inserted well into the interior of the cylinder.

Another object is to provide a novel means for securing a resilient cup to the body of a piston.

Another object is to provide a piston in which the cavity in the end receiving the brake pin has sloping sides so as to facilitate the seating of the brake pins.

Another object is to provide a piston assembly which has a resilient protrusion extending beyond the lips of the cup so as to prevent the lips from coming in contact with the end of the cylinder.

Another object is to provide a piston cup with improved sealing characteristics.

Further objects and advantages of the present invention will be apparent from the following description, reference being had to the accompanying drawing, in which:

Fig. 1 is a sectional view, partly in elevation, showing a two-piston arrangement within a cylinder in released position;

Fig. 2 is a transverse sectional view taken on the line 2—2 of Fig. 1;

Fig. 3 is a sectional view, showing the two piston arrangement of Fig. 1 in extended, operative position;

Fig. 4 is a diametrical sectional view of the piston;

Fig. 5 is a diametrical sectional view of a single piston and cylinder assembly;

Fig. 6 is a diametrical sectional view of a modified form of piston; and

Fig. 7 is a diametrical sectional view of another modified form of piston.

Referring to the drawing more particularly by reference numerals, 10 indicates a piston body having an outer surface 12 which slides on the inner surface of a cylinder 14. The piston 10 has a shoulder 13 which extends inwardly, a nose portion 15 which protrudes from the shoulder, and a cavity 19 for receiving brake pins 22 or 23, the cavity having inclined sides 17 which start from a narrow edge 16 on the end of the piston body 10 and terminate in a preferably hemispherical shaped pin receiving socket 18. Fitted over the protrusion 15 and abutting the shoulder 13 is a resilient cup 11 which has an inverted lip portion 20 in the shape of a generally cylindrical outer wall normal to the shoulder 13, the inner edge 20' of the free end of the lip portion being beveled or tapered to increase the sealing effect thereof, and a button-like projection 21 extending outwardly from the end of the assembly. On the top of the cylinder is a hole 25 through which the brake fluid enters the cylinder, and frictionally attached to each end of the cylinder and the corresponding brake pin is a boot 24 which prevents foreign matter from entering the ends of the cylinder. The cylinder 14, the boot 24 and the brake pins 22 and 23 are old in the art, and as such are not part of the invention.

As shown in Figs. 1, 3, 4 and 5, the protrusion 15 is cylindrical in shape, whereas, in the modified form shown in Fig. 6, it is shown as a hemisphere 15', and in Fig. 7 it is shown as a frustum 15" of a cone.

In the single piston arrangement, the cup 11 is mounted on the piston body 10, as shown in Fig. 4, and the assembly inserted in the cylinder 14', as shown in Fig. 5, with the button-like projection 21 adjacent the closed end of the cylinder. The primary function of the projection is to keep the lip of the cup away from the end of the cylinder and the fluid inlet 25', so that there will be an unobstructed flow of the fluid into the cylinder and against the inner surface of the cup.

In the two piston arrangement, two assemblies are inserted, as shown in Fig. 1, with the projections 21 abutting in the plane of the inlet hole.

*Operation (Figs. 1 and 3)*

When the pressure of the fluid between the ends of the pistons is increased due to additional fluid entering the cylinder 14 through the inlet hole 25 when the brake (not shown) is actuated, the fluid, acting on the cups 11, forces the pistons 10 outwardly, thereby moving the brake actuating pins 22 and 23.

Because the end of the brake actuating pin is brought well forward in the piston body and within the fluid pressure area, the amount of wear on the sliding surfaces of the assembly and the possibility of the pistons binding within the cylinder, due to lateral forces exerted on the actuating pin, are reduced.

The beveled or tapered inner edge 20' of the cup lip 20 decreases the possibility of the lip collapsing and results in improved sealing characteristics because of the more even distribution of the fluid pressures around the inner surfaces of the cup lip. Also, the lip portion 20 being relatively thick further decreases the possibility of the lip collapsing.

The sloping sides 17 of the pin receiving cavity 19 facilitate the seating of the actuating pins 22 and 23 and the narrow annular outer edge 16 around the cavity 19, and the steeply sloping sides 17 permit the boot 24 to fit well within the cavity without touching the sides thereof.

The projection 21 formed on the end of the cup 11 disposes of the necessity of using an additional spring member between the ends of the pistons, and the cup 11 being frictionally fitted over the protrusion 15 on the end of the piston body 10 provides a simple securing means which does not necessitate the use of holding screws or the like. The relatively thin construction of the side walls of the cup-shaped portion facilitates the fitting of the cup over the protrusion on the end of the piston.

It is to be understood that the present invention is not limited to hydraulic systems, but may also be used with pneumatic systems and the like.

While the forms of embodiment of the invention as described constitute preferred forms, it is to be understood that other forms might be adopted, all coming within the scope of the claim which follows.

What is claimed is:

In a piston and sealing cup assembly for mounting in a cylinder of an hydraulic brake system to thereby actuate a brake shoe through a piston pin having an inner rounded end, said assembly comprising a one-piece piston having a cylindrical body portion for sliding in the cylinder and having on its forward end a smooth cylindrical nose portion of a diameter approximately one-half of the body portion and a length less than the body portion, said piston having a cavity in its rear end for receiving the piston pin, the inner end of said cavity extending substantially half way into the length of the nose portion and being rounded for engagement with the rounded end of said pin and said cavity beginning adjacent the rear of the rounded inner end flaring outwardly to the rear end of the piston closely adjacent the periphery of the body portion, said sealing cup of the assembly being made of resilient material and having a cup-shaped portion fitting over and snugly surrounding the nose portion of the piston and an annular integral lip portion at the rear of the cylindrical wall of the cup-shaped portion with said forward edge of the lip portion which is to have sealing engagement with the cylinder being rearward of the forward wall of the cup-shaped portion a substantial distance, said cup-shaped portion having a relatively thin wall and the base of the lip portion being relatively thick in both the radial and axial directions, the end wall of the cup-shaped portion having on its outer surface at the center thereof an integral projection to provide a bumper for the assembly.

NOEL S. REYNOLDS.

REFERENCES CITED

The following references are of record in the file of this patent:

UNITED STATES PATENTS

| Number | Name | Date |
|---|---|---|
| 1,222,363 | Christenson | Apr. 10, 1917 |
| 1,715,406 | Christenson | June 4, 1929 |
| 2,111,312 | Clark | Mar. 15, 1938 |
| 2,196,995 | La Brie | Apr. 16, 1940 |
| 2,428,452 | Farmer | Oct. 7, 1947 |

FOREIGN PATENTS

| Number | Country | Date |
|---|---|---|
| 348,411 | Italy | May 19, 1937 |